United States Patent [19]

Jordan et al.

[11] 4,405,997

[45] Sep. 20, 1983

[54] APPARATUS FOR RIDDLING BOTTLED WINES

[75] Inventors: James L. Jordan, Guerneville; James E. Huntsinger, Windsor; Dale F. Steinke, Guerneville; David W. Williams, Bakersfield, all of Calif.

[73] Assignee: F. Korbel and Bros., Guerneville, Calif.

[21] Appl. No.: 266,833

[22] Filed: May 26, 1981
(Under 37 CFR 1.47)

Related U.S. Application Data

[63] Continuation-in-part of Ser. No. 151,129, May 19, 1980, Pat. No. 4,356,208, which is a continuation-in-part of Ser. No. 890,305, Mar. 27, 1978, Pat. No. 4,235,940.

[51] Int. Cl.³ .............................................. B01F 11/00
[52] U.S. Cl. ................................... 366/111; 99/277.2; 366/128; 366/208; 366/219
[58] Field of Search ..................... 99/277.1, 277.2, 275; 426/592; 366/110, 111, 114, 108, 128, 208, 219, 239

[56] References Cited

U.S. PATENT DOCUMENTS

| 2,056,014 | 9/1936 | Moore | 366/209 |
| 2,514,078 | 7/1950 | Lee | 366/128 |
| 3,281,125 | 10/1966 | Shoe | 366/111 |
| 3,533,602 | 10/1970 | Heck | 99/277.2 |

FOREIGN PATENT DOCUMENTS 3996 2/1905 France .............................. 99/277.2

Primary Examiner—Robert W. Jenkins
Attorney, Agent, or Firm—Schapp and Hatch

[57] ABSTRACT

Apparatus for riddling bottled wine having an elongated frame carried on resilient supports along the longitudinal sides of the frame and having a motor-driven eccentric weight carried on the frame for vibrating the frame and cases of bottles thereon in directions perpendicular to the longitudinal center line of the frame, together with rows of inflatable air bags along opposite sides of the frame for alternately lifting such sides and jostling bottles of wine within their compartments in cases supported on the frame. A clock system controls the power supply to the vibrator motor and the air supply to the inflatable air bags, the clock system being adjustable for supplying electrical current to the vibrator motor at pre-selected times and for periods of pre-determined duration, and for supplying air under pressure alternately to the air bags at one side or the other of the frame at selectively pre-determined intervals and for periods of pre-determined duration. The frame is supported on rows of resiliently compressible members having cradles formed for supporting the ends of the frame not being lifted by the air bags, the motor-driven eccentric weight rotating upon and about an axis parallel to the longitudinal center line of the frame so that the plane of rotation is perpendicular to such center line.

12 Claims, 8 Drawing Figures

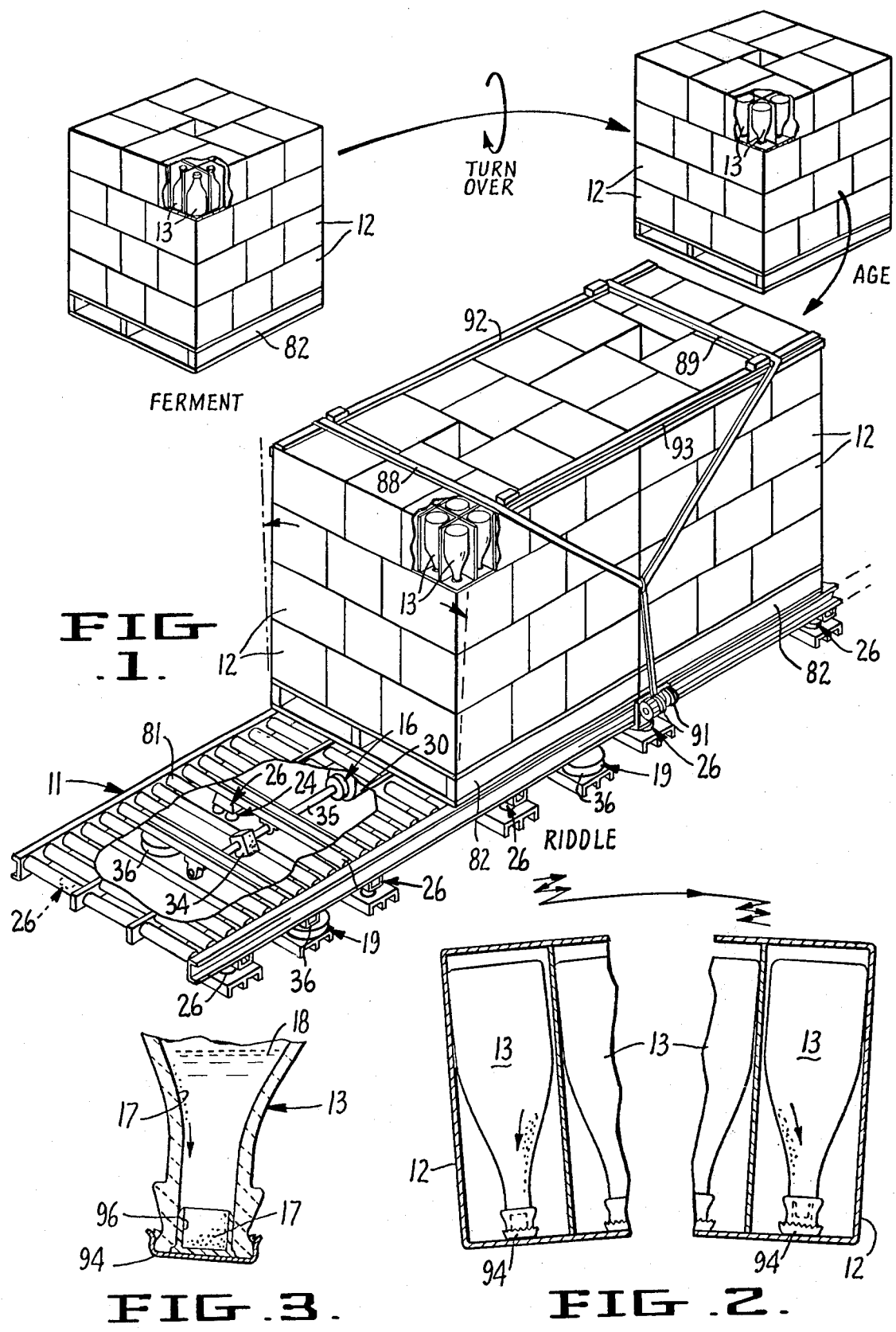

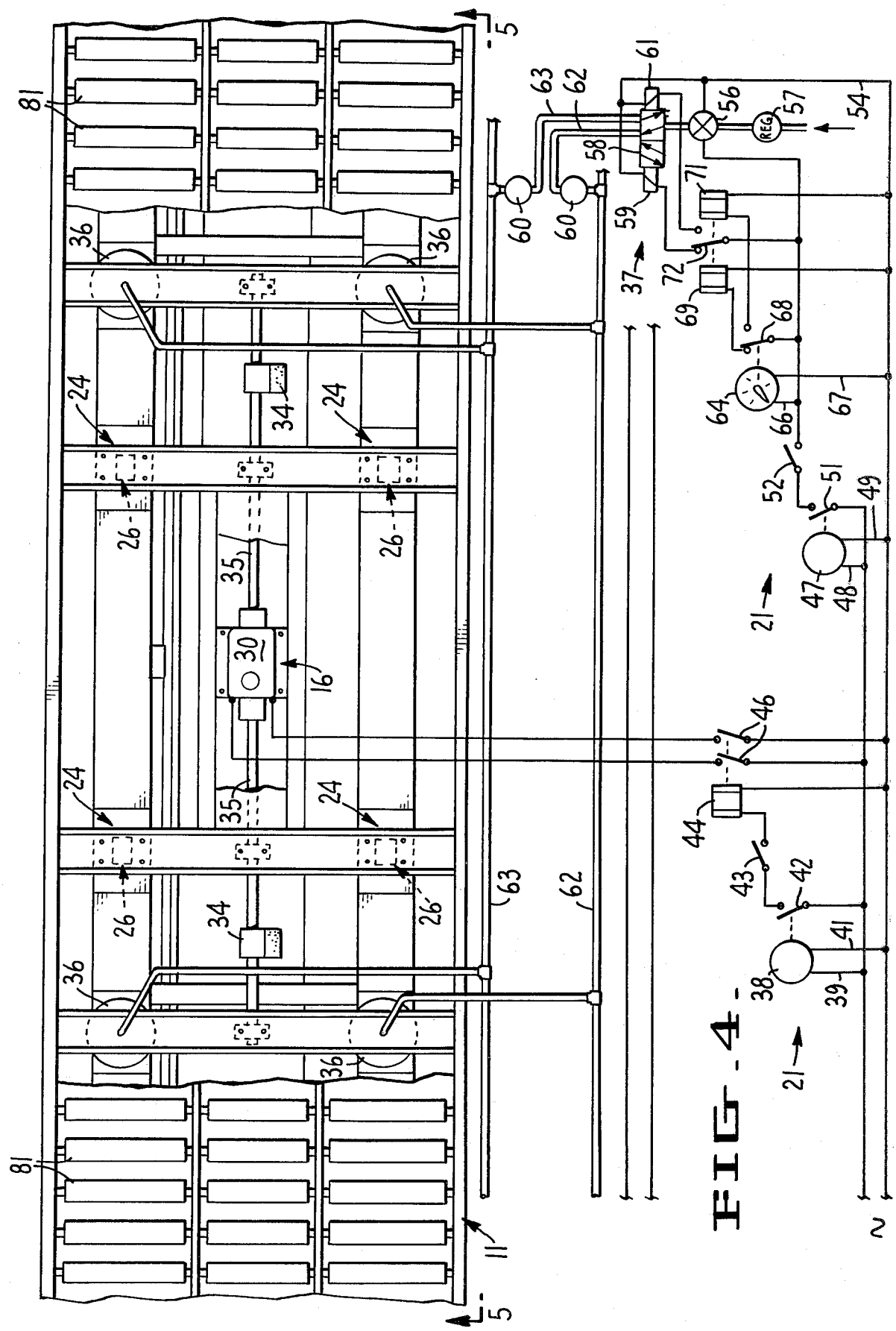

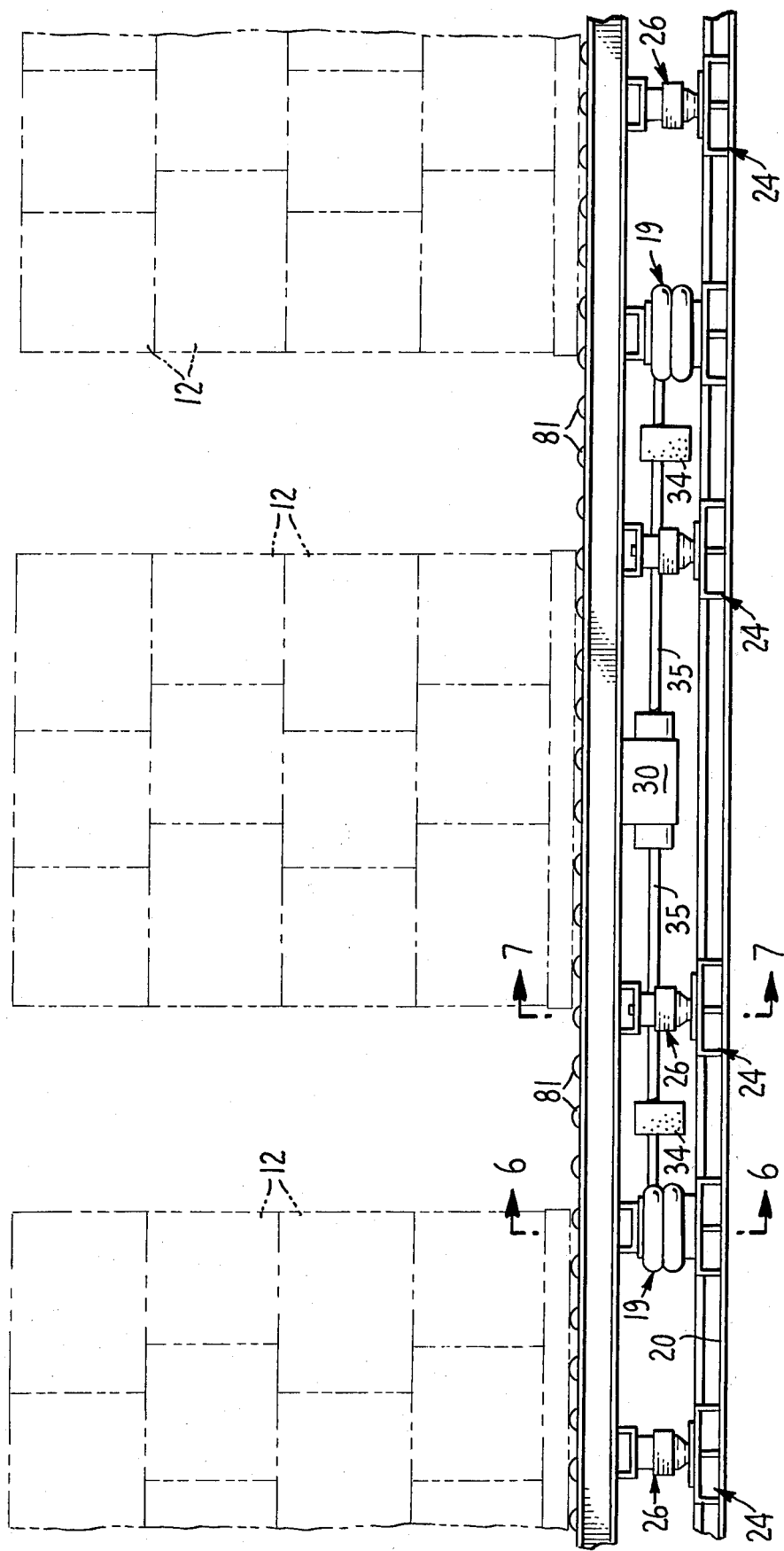

APPARATUS FOR RIDDLING BOTTLED WINES

CROSS-REFERENCES TO RELATED APPLICATIONS

This application is a continuation-in-part of application Ser. No. 151,129, filed May, 19, 1980, now U.S. Pat. No. 4,356,208, and entitled Method and Apparatus for Riddling Bottled Wines in Cases, said application being a continuation of application Ser. No. 890,305, filed Mar. 27, 1978, now U.S. Pat. No. 4,235,940, of David W. Williams, James L. Jordan and James E. Huntsinger for Method and Apparatus of Riddling Bottled Wine in Cases.

BACKGROUND OF THE INVENTION

1. Field of the Invention

The present invention relates to apparatus for riddling bottled wines in cases, and more particularly to improved devices for supporting and vibrating a tiltable frame upon which cases of bottled wine are supported.

2. Description of the Prior Art

In the making of fine wines, and particularly in the making of champagne, which is fermented in the bottle, it is necessary to remove all suspended solids and sediment in order for the wine to have a sparkling, clear appearance. This sediment is the natural result of the fermentation process and includes yeast and other solid matter, often in the form of extremely fine particles which would impart a cloudy appearance if left in the wine. The process of removing such sediment from bottled wine has come to be known as "riddling".

The traditional method of accomplishing riddling involves manually grasping each bottle, pulling it part way out of the supporting rack, rotating the bottle approximately 90°, and thereafter slamming the bottle back into the rack with sufficient force to cause the desired action. The purpose of riddling is to deposit all of the yeast and other solids at the outlet of the bottle so that they may be removed later. Removal of the accumulated sediment from the bottle is conventionally accomplished by freezing the neck of the bottle, removing the temporary crown cap, ejecting the frozen slug of wine containing the sediment and solvents, and then corking the bottle.

Attempts have heretofore been made to utilize mechanical apparatus for accomplishing the riddling of bottled wines. For example, U.S. Pat. No. 2,056,014 discloses a rack formed for spinning rows of bottles, these racks being adapted to tilt the bottles from side to side and to vibrate the rack and the bottles thereon to accomplish riddling. These rack methods are considerably less labor-intensive than the original hand method. However, the bottles still must be placed in temporary cartons and placed in position on the rack, then removed one-by-one from the racks when the riddling function has been accomplished and returned to the temporary cartons for transporting to neck-freezing and disgorging apparatus.

SUMMARY OF THE INVENTION

Brief Summary of the Invention

The method and apparatus of the present invention eliminates a great part of the hand labor necessary with riddling racks for removing the bottles from the temporary cartons and placing them in the racks, and for removing the bottles from the racks after riddling and replacing them in the temporary cartons. The present invention accomplishes this desirable result by fermenting the bottled wines in compartmented packing cases, tilting the cases from side to side to jostle the bottles, and vibrating the entire cases of bottles, with the jostling and vibrating serving to free the solids from adherence to the inner surfaces of the neck of the bottle as they settle to the outlet.

This concept makes possible even greater savings of labor by loading the cases onto pallets, where they remain during the entire fermentation, aging and riddling processes. Thus, during riddling, entire pallet loads of cases of bottled wine are vibrated and are tilted from side to side to accomplish the desired jostling of the bottles in the cases.

Different types of wines, and even different batches of the same type of wine, have different characteristics with regard to particle size, specific gravity, coherence and adherence. The vibrating action and the jostling action must be such as to dislodge the settling particles from the downwardly constricting surface of the neck of the bottle so that the solids will settle onto the crown cap or other member at the outlet of the bottle for convenient disgorging of the sediment as by freezing in a slug of ice. At the same time, to accomplish the riddling action in the least possible time, it is desirable that neither the jostling action nor the vibrating action agitate the bottles sufficiently to stir the settled particles back into the main body of the wine. Accordingly, the number and frequency of the tiltings and the intensity and duration of the vibrating action are made adjustable for obtaining best results with the particular wine being riddled, and the character, magnitude and direction of vibrating and tilting are carefully controlled.

It is therefore an object of the present invention to provide an apparatus for riddling champagne and the like which is much less labor intensive than previous methods, with the bottles of the wine being contained in compartmented shipping cases during the fermentation, aging and riddling process.

Another object of the invention is to provide an apparatus of the character described wherein a plurality of cases of bottled wine are supported on a pallet, and the bottled wine in an entire pallet load of cases is allowed to ferment with the bottles in upright position, the pallet load of cases then being turned over to invert the bottles for aging, with the pallet load of cases then being periodically tilted from side to side and vibrated to jostle and vibrate the bottles and cause the solids in the wine to settle into the extreme end of the necks of the bottles.

Another object of the present invention is to provide an apparatus of the character described in which tilting and vibrating periods of predetermined length alternate with rest periods of predetermined length.

A further object of the invention is to provide an apparatus of the character described in which the character, magnitude and direction of vibrating and tilting are controlled to produce optimum results.

Another object of the present invention is to provide an apparatus capable of supporting, tilting and vibrating a plurality of cases of bottles supported on a pallet.

Yet another object of invention is to provide an apparatus of the character described in which the tilting and vibrating operations are accomplished automatically without human attention.

A still further object of the present invention is to provide an apparatus of the character described in which the frequency and duration of the tilting action and the duration of the vibratory action may be adjusted to provide optimum results with the particular wine undergoing riddling.

Further objects and features of advantage will become apparent from the following specification and claims.

Preferably, the bottles of wine are packed in compartmented shipping cases, where they remain during the entire fermentation, aging, settling, and riddling procedures. To carry this out, clarified wine is placed in bottles, together with yeast, sugar and bentonite, the bottles then being temporarily sealed with crown caps and placed in individual compartments in conventional shipping cartons or cases. The cases of bottles are then stacked on pallets with the bottles upright. The loaded pallets are maintained in this position (bottles upright) at a control temperature of about 65° to 70° Farenheit for a period of about two to six months, during which fermentation takes place.

At the end of the fermentation period, a second pallet is placed on top of the pallet load of cases, and the entire load is lifted and turned upside down, preferably by an inverting forklift, so that the bottles are standing on their crown caps. The inverted cases, now supported by the second pallet, are allowed to stand for from about six months to eighteen months. During this period, the wine ages and the major portion of solids in the wine settles down into the necks of the bottles. The bentonite is a colloidal mineral clay, the particles of which when dispersed through the wine have an affinity for yeast cells and other solids. Because of higher average specific gravity, the bentonite particles and the solids adhering thereto tend to sink more rapidly through the wine into the necks of the inverted bottles than would the solids alone. In this manner, approximately 95% to 98% of particles and suspended solids settle out into the neck during the aging and settling period.

The pallets and their cases of inverted bottles are then vibrated and tilted sharply from side to side. This tilting action jostles the bottles in their individual compartments. It should be noted that the diameter of the bottles is slightly less than the corresponding dimension of the individual shipping case compartment in which the bottle is contained, and the bottles are somewhat shorter than the height of the individual compartments. Thus, when the case is tilted quickly to one side, the bottle pivots on the crown cap resting against the end of the compartment in the direction of incline. When the case is quickly tilted in the opposite direction, the bottle flops over against the opposite wall of the compartment. Although the clearance is comparatively small, about one-eighth inch, it is believed that the flip-flop action of the bottles in the compartments materially enhances the jostling effect.

The purpose of the jostling is to dislodge particles which may have settled onto the inwardly curving walls of the neck of the bottle from any adjerance to the bottle so as to promote settling of such particles onto the crown cap or other device fitted across the mouth of the bottle. The described vibrating of the pallet and cases of bottles also serves to dislodge settled particles from the walls of the neck of the bottles and assist the particles to settle on the crown cap.

In carrying out the method of the invention, it has been found that the solids in some wines tend to adhere more firmly to the bottle. The method of the present invention therefore contemplates controlling the jostling and vibrating actions in accordance with the characteristics of the particular wine being riddled. It has been found that the jostling and vibrating actions should be intermittent, with periods of activity being separated by rest periods during which solids can settle further down into the necks of the bottles. The duration of the periods of activity and the rest periods is controlled in accordance with the characteristics of the solids in the particular wines being riddled.

It has also been found that optimum riddling of most champagnes can be accomplished by providing active periods of from about ten minutes to about thirty minutes separated by rest periods of from about one hour to about six hours. A large number of cases of champagne have been riddled utilizing the method of the present invention in active periods of about one hour and forty-five minutes, so that the entire cycle takes place during a two hour period of time.

When the bottled wine has been sufficiently clarified by the riddling process of the present invention, the necks of the inverted bottles are refrigerated to freeze a slug of ice in the neck containing the settled solid, the crown caps are removed so that the internal pressure of the gases in the bottles can eject the slugs of ice, and the bottles are corked. Under certain conditions it is preferred to place a small plastic cup in the mouth of the bottle before the crown cap is applied. When the bottle is inverted, this cup opens upwardly to receive the solids. This cup of "bidule" may then be discharged with its contained solids from the bottle when the crown cap is removed.

The apparatus of the present invention is designed to carry out the described processing upon very large numbers of cases of bottles simultaneously and automatically. A preferred form of this apparatus is illustrated in the accompanying drawings, in which:

FIG. 1 is a perspective view of an apparatus constructed in accordance with the present invention.

FIG. 2 is a fragmentary view on an enlarged scale of portions of the cases of bottles illustrating the tilting of the bottles accomplished by the apparatus for jostling the bottles.

FIG. 3 is an enlarged fragmentary cross sectional view of the neck portion of one of the bottles of FIG. 2 showing settling of solids from the bottled wine into a fitment at the mouth of the bottle.

FIG. 4 is a schematic plan view of a portion of the apparatus of FIG. 1 with associated electrical and air supply controls shown diagrammatically.

FIG. 5 is a fragmentary longitudinal view, on an enlarged scale, of a portion of the apparatus, this view being taken substantially on the plane of line 5—5 of FIG. 4.

Figure 6:
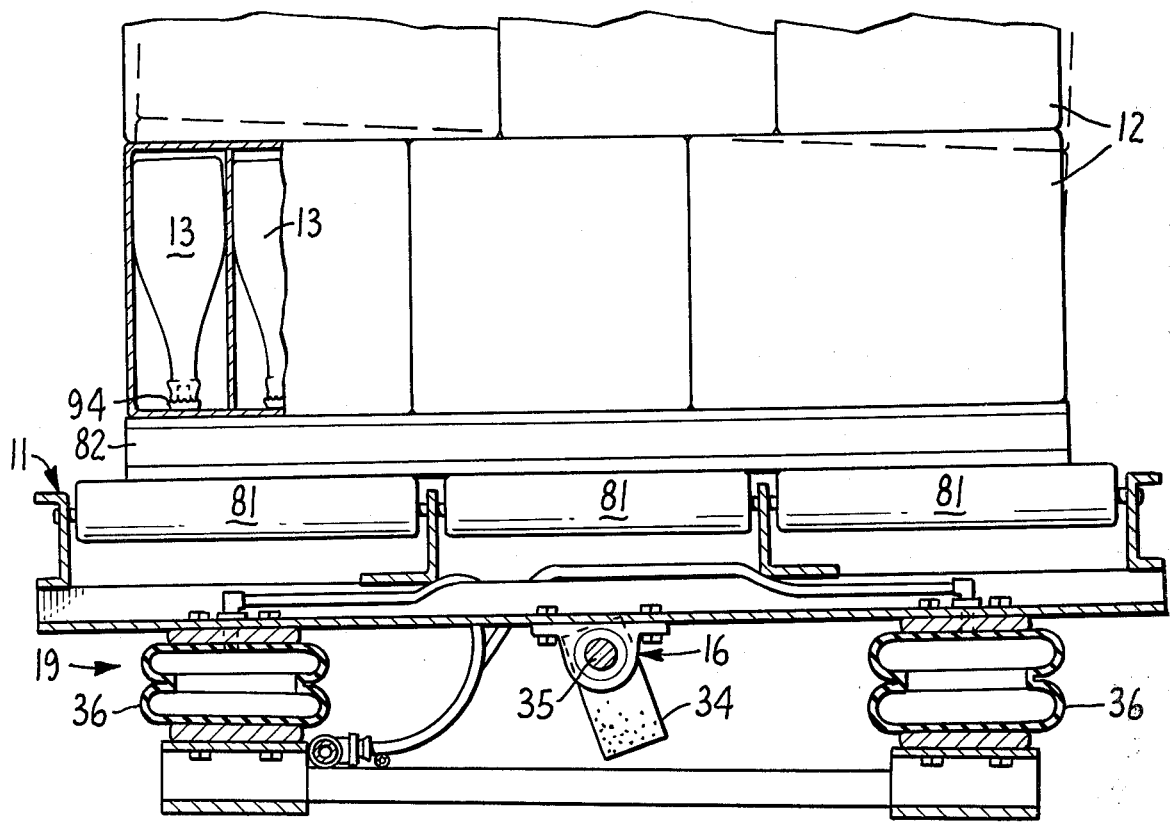
FIG. 6 is a transverse sectional view taken substantially on the plane of line 6—6 of FIG. 5.
Figure 8:
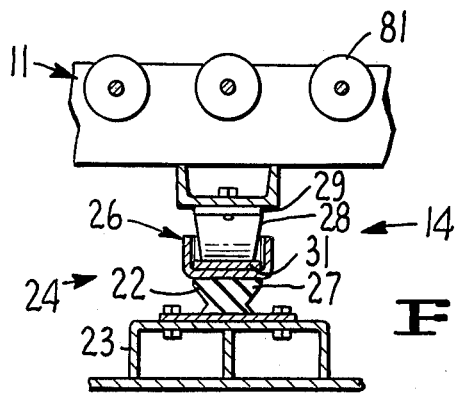
FIG. 8 is a transverse sectional view taken substantially on the plane of line 8—8 of FIG. 7.

While only one preferred form of the invention is illustrated in the drawings, it will be apparent from the specification and claims that certain modifications may be made to the apparatus without departing from the spirit of the invention.

Referring to the drawings in detail, it will be seen that the apparatus of the present invention, for riddling bottled wine in cases includes a frame 11 formed for supporting one or more compartmented cases 12 containing bottles 13 of wine in an inverted neck down position, a resilient support means 14 for the frame 11, and means 16 for vibrating frame 11 and the cases 12 and bottles 13 thereon for dislodging solids 17 in the wine 18 from adherence to the bottles 13 whereby such solids may settle to the outlets of the bottles.

Means 19 also is provided for rapidly tilting the frame 11 and cases of bottles thereon for jostling the bottles 13 so as to dislodge the solids 17 from adherence to the bottles whereby such solids may settle to the outlets of the bottles. The vibrating means 16 and tilting means 19 cooperate together to accomplish maximum riddling effect.

In accordance with the present invention, timing means 21 is provided; the timing means 21 being formed for selective intermittent operation of the vibrating means 16 and tilting means 19. Preferably, the timing means 21 is formed for automatically cycling the vibrating means 16 and tilting means 19 independently through active and passive periods of predetermined and ajustable duration. This permits the apparatus to be used with optimum effect on loads of various sizes, wines of different characteristics, different sizes of bottles, etc.

As may best be seen in FIGS. 1, 5, 7 and 8 of the drawings, the resilient support means 14 provides a plurality of resilient supports arrayed along the opposite longitudinal sides of frame 11, the resilient support means 14 being formed for permitting freedom of tilting and freedom of vibration of the frame and the load carried thereon. Each of the resilient support means 14 comprises a plurality of resiliently compressible units 22 carried on box members 23 attached to a horizontal supporting surface such as the floor 20. The units 22 are formed of resiliently compressible material, such as natural or synthetic rubber, and support cradle means 24 is mounted between the units 22 and the underside of frame 11, the cradle means 24 being formed for accommodating tilting angular movement of the frame 11 relative to the floor 20, see FIG. 7.

The cradle means 24 provides an upwardly opening trough shaped member 26 attached to and supported on a plate 27 mounted on top of the resiliently compressible units 22, together with a cylindrical member 28 attached to a mounting plate 29 secured to the underside of frame 11.

Figure 7:
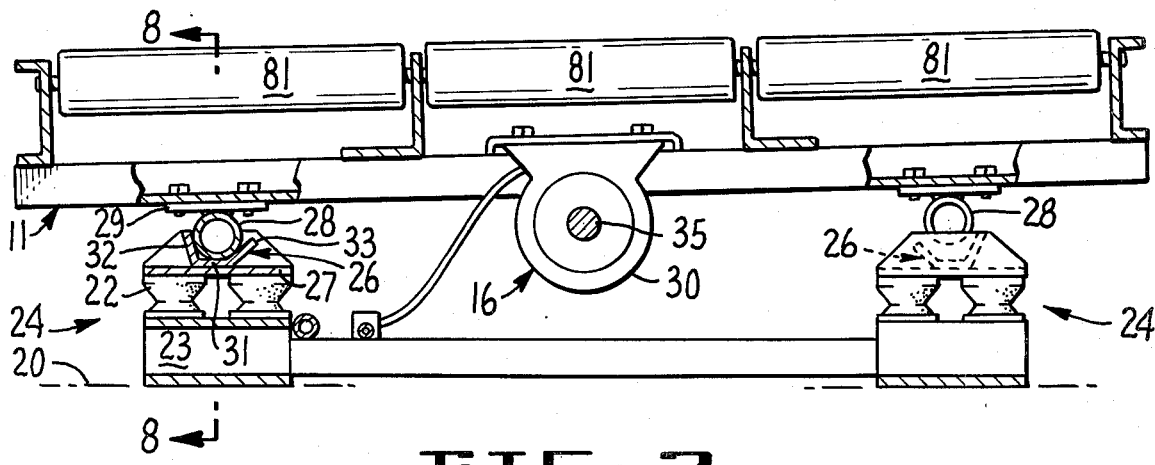
FIG. 7 is a fragmentary transverse sectional view taken substantially on the plane of line 7—7 of FIG. 5.

When the frame 11 is tilted, as viewed in FIG. 7 of the drawings, the members 28 rest in and are supported by the trough members 26 along the left side of the frame, as viewed in FIG. 7. The corresponding trough members 26 along the other side of frame 11 are lifted out of contact with the trough 26 when in the position shown. It should be noted that the cylindrical shape of members 28 provides for easy pivoting action around the axes thereof as the opposite side of the frame moves up and down.

Preferably, the trough shaped members 26 have a flattened bottom 31 and upwardly inclined flanges 32 and 33 proceeding from opposite sides of the bottom, with flange 33 being inclined less steeply than flange 32. This shape insures that the member 28 will land in proper position in trough 26 when it is no longer being lifted.

As here shown, the units 22 are in the form of a pair of generally frusto-conical bodies integrally joined at their frustrums. This configuration, in conjunction with the configuration of the trough member 26 and cylindrical member 28 provides a self-positioning action for each side of the frame as it is allowed to descent and again be supported by the cradle means 24.

The means 16 for vibrating the frame 11 includes a plurality of electric motors 30 mounted on the underside of frame 11 and driving a shaft 35 journalled in bearings secured to frame 11. A weight 34 is eccentrically secured to shaft 35 for joint rotation therewith. The speed of rotation of weight 34, and hence the periodicity of the vibration, is governed by controlling the speed of drive motor 30. By reason of the plane of rotation of eccentric weight 34 being perpendicular to the longitudinal axis of frame 11, an advantageous vibration of the contents of the bottles 13 is obtained. Also, the intensity of the vibration is adjustable by varying the mass and lever arm of each of the eccentric weights 34.

The means 19 for tilting the frame 11 preferably comprises axially expandable lifting members 36 arranged in pairs, with the members of a pair being mounted to exert lifting force on opposite sides of the frame 11. The tilting members are formed to permit vibration of the frame both in lifting mode and non-lifting mode.

Preferably, and as here shown, the tilting means 19 includes pairs of inflatable air bags 36, together with valve means 37 for selectively inflating and deflating the air bags to alternately lift opposite sides of frame 11 so as to cause desired back and forth tilting of the frame. Valve means 37 operates with sufficient rapidity for quick tilting of the frame 11 from one side to the other to accomplish the desired jostling action on the bottles 13 in their cases 12.

As may best be seen in FIG. 4 of the drawings, the timing means 21 is formed for activating the vibrating means 16 and tilting means 19 at pre-selected times and for periods of desired duration. The vibrating means 16 here is controlled by a clock timer 38 connected by leads 39 and 41 to a suitable source of alternating current. The clock timer 38 may be programmed to close switch 42 at predetermined times and to open switch 42 after a desired interval. With disabling switch 43 closed, closing of switch 42 supplies electrical current to relay 44, which, when energized, closes switches 46 to supply electrical current to motors 30 and cause rotation of the eccentric weights 34.

A clock timer 47, similar to clock timer 38, is connected to a suitable source of alternating current by leads 48 and 49, clock timer 47 being formed for closing switch 51 at pre-selected times and reopening switch 51 after an interval of desired duration has elapsed. With disabling switch 52 closed, closing of switch 51 supplies current through leads 53 and 54 to open an air supply valve 56 connected through a pressure regulator 57 to a suitable source of air under pressure (not shown).

Upon opening of air supply valve 56, air under pressure is furnished to a "Vice-Versa" valve 58 actuated by solenoids 59 and 61 for alternately supplying air under pressure through conduits 62 and 63 to the air bags 36 on one side or the other of the frame 11. The row of air bags 36 being supplied air under pressure expand axially to lift their side of frame 11. At the same time, quick exhaust valves 60 in conduits 62 and 63 permit rapid deflation of the row of air bags not being supplied with air under pressure, permitting that side of frame 11 to lower as far as units 22 permit.

Electrical power is supplied alternately to solenoids 59 and 61 by an adjustable interval flip-flop device 64 connected by leads 66 and 67 to a source of alternating current. Device 64 alternately supplies current to solenoids 59 and 61 of vice-versa air valve 58.

The flip-flop device 64 may be preset to accomplish a desired number of back and forth tiltings of frame 11 during each active period. Thus, device 64 may comprise a time delay relay or similar device which supplies current through alternate leads at predetermined intervals. A suitable relay is depicted in FIG. 4 of the drawings, in which the device 64 moves switch 68 from one to the other of its terminal positions at desired timed intervals. Depending upon the position of switch 68, current is supplied to one or the other of relay coils 69 or 71, moving switch 72 to one of its terminal positions. This alternating action continues throughout each active cycle of the apparatus as determined by the clock controlled closing of switch 51.

The apparatus of the present invention is particularly capable of simultaneously riddling very large numbers of bottles of wine. The frame 11 is preferably elongated and equipped with conveyor rollers 81 capable of supporting conventional pallets loaded with cases 12 of bottles 13 of wine to be riddled. As may be apparent from FIG. 4 of the drawings, the frame 11 may be as long as desired, and is equipped with rows of air bags 36 along each longitudinal side. Vibrating motors 30 are mounted at spaced intervals along the frame 11 and drive eccentric weights 34 positioned under the rollers 81. The resilient support means 22 are also positioned at spaced intervals along frame 11 beneath the rollers 81. Restraint of the frame 11 against excessive lateral or longitudinal movement on its floating mountings is provided by the restraining action of trough members 26 on cylindrical members 28. The vibration, tilting and vertical movement of frame 11 is not hampered, but excessive horizontal movement is constrained.

The pallet loads of cases of bottles are preferably tied down to the frame during the riddling operation. A suitable tie down device is illustrated in FIG. 1 of the drawings, wherein a pair of flexible bands 88 and 89 are passed over the tops of the loads of boxes on adjacent pallets 82 and are pulled tight by ratchet winch devices 91 mounted at opposite sides of the frame 11. The cartons 12 are protected against crushing by removable members 92 and 93.

As may be seen in FIG. 3 of the drawings, the riddling action of the apparatus causes the solid particles 17 to settle out of the wine onto the crown cap 94. Ordinarily, the solids rest directly upon the crown cap until they are frozen into the plug of ice which is ejected when the crown cap is removed. It has been found that a small plastic cup 96, sometimes called a "bidule", may be inserted into the mouth of the bottle before the crown cap 94 is applied. The solids 17 will then settle into the bidule 96 and may be discharged from the bottle with the dibule when the crown cap is removed.

In view of the foregoing, it will be seen that the apparatus of the present invention provides extremely efficient automatic mechanical riddling of bottled wines by permitting the fermenting, aging and settling, and riddling operations to be carried out in an efficient and economical manner.

I claim:

1. In an apparatus for riddling wine having a frame formed for supporting a plurality of bottles of wine in an inverted neck down position and means for repeatedly tilting the frame to a first position and vibrating it while in such first position, then tilting the frame to a second position and vibrating it while such second position, a frame support comprising resilient support means at opposite sides of the frame formed for permitting freedom of tilting and freedom of vibration of the frame and bottles of wine carried thereon.

2. A frame support as claimed in claim 1, and wherein said resilient support means comprises a plurality of resiliently compressible units arrayed along the sides of the frame which move upwardly and downwardly during tilting of the frame.

3. A frame support as claimed in claim 2, and wherein said support means further comprises members of resiliently compressible material formed for securing to a horizontal supporting surface, and cradle means mounted between said members and said frame and formed for accommodating tilting angular movement of said frame relative to said supporting surface.

4. A frame support as claimed in claim 3, and wherein said cradle means comprises an upwardly opening trough shaped member attached to and supported on a said member of resiliently compressible material, and a cylindrical member secured to the underside of said frame and receivable in said trough shaped member.

5. A frame support as claimed in claim 4, and wherein said trough shaped member has a flattened bottom, and upwardly inclined flanges proceeding from opposite sides of said bottom, with the flange at the side of said trough shaped member facing the cradle means at the other side of said frame being inclined less steeply than the flange at the opposite side of said trough shaped member.

6. A frame support as claimed in claim 4, and wherein each of said trough shaped members is supported on a spaced pair of members of resiliently compressible material.

7. A frame support as claimed in claim 6, and wherein said members of resiliently compressible material are in the form of a pair of generally frusto-conical bodies integrally joined at their frustrums.

8. A frame support as claimed in claim 3, and wherein said means for tilting said frame comprises a plurality of air bags arrayed along the same sides of the frame as said resiliently compressible units, and means for selectively inflating and deflating said air bags along the opposite sides of said frame so as to cause desired back and forth tilting of the frame.

9. A frame support as claimed in claim 8, and wherein said means for inflating and deflating said air bags operates with sufficient rapidity to accomplish a desired jostling action on the bottles as said frame is tilted from side to side.

10. A frame support as claimed in claim 9, and wherein the side of said frame at which said air bags are inflated is lifted thereby out of contact with said cradle means on such side and the side of said frame at which said air bags are deflated is supported on said cradle means on such side.

11. In an apparatus for riddling wine having an elongated rectangular frame formed for supporting a plurality of bottles of wine in an inverted neck down position and means for repeatedly tilting the frame, means for vibrating the frame, comprising
    a plurality of motors mounted on the underside of said frame at spaced locations along the longitudinal centerline thereof and having their shafts extending in parallel spaced relation to said centerline,
    and a plurality of eccentric mass rotors secured to said shafts for rotation therewith.

12. A frame support as claimed in claim 11, and wherein a plurality of support members of resiliently compressible material formed for securing to a horizontal supporting surface are arrayed along the longitudinal sides of said frame, and cradle means are mounted between said support members and said frame, said cradle means being formed for accommodating tilting angular movement of said frame relative to said supporting surface.

* * * * *